United States Patent
Deley, Jr. et al.

(10) Patent No.: US 10,960,500 B2
(45) Date of Patent: Mar. 30, 2021

(54) FRICTION WELDING HEAD WITH TWO-PIECE CLAMPING COLLET

(71) Applicants: Frank L. Deley, Jr., Boardman, OH (US); Phillip James Truitt, Canfield, OH (US)

(72) Inventors: Frank L. Deley, Jr., Boardman, OH (US); Phillip James Truitt, Canfield, OH (US)

(73) Assignee: Taylor-Winfield Technologies, Inc., Youngstown, OH (US)

(*) Notice: Subject to any disclaimer, the term of this patent is extended or adjusted under 35 U.S.C. 154(b) by 349 days.

(21) Appl. No.: 15/945,029

(22) Filed: Apr. 4, 2018

(65) Prior Publication Data

US 2019/0111526 A1    Apr. 18, 2019

Related U.S. Application Data

(60) Provisional application No. 62/571,858, filed on Oct. 13, 2017.

(51) Int. Cl.
*B23K 20/00* (2006.01)
*B23K 37/053* (2006.01)
(Continued)

(52) U.S. Cl.
CPC .......... *B23K 37/053* (2013.01); *B23B 31/202* (2013.01); *B23K 20/129* (2013.01);
(Continued)

(58) Field of Classification Search
CPC ................ B23K 20/122; B23K 20/123; B23K 20/1285; B23K 20/14; B23K 20/125; B23K 20/1255; B23K 20/129; B23K 20/1205; B23K 20/1245; B23K 20/12; B23K 20/1265; B23K 2101/045; B23K 20/227; B23K 20/124; B23K 2101/26; B23K 20/126; B23K 20/26; B23K 37/0408;
(Continued)

(56) References Cited

U.S. PATENT DOCUMENTS

| 3,452,421 A * | 7/1969 | McKinley | B23K 20/12 228/114.5 |
| 3,471,180 A * | 10/1969 | Loyd | B25B 27/10 285/257 |

(Continued)

FOREIGN PATENT DOCUMENTS

| DE | 202017103344 | 6/2017 |
| EP | 2163338 | 3/2010 |

(Continued)

OTHER PUBLICATIONS

International Search Report and Written Opinion, dated Jan. 31, 2019, in connection with PCT/US18/051003, filed Sep. 14, 2018.

*Primary Examiner* — Erin B Saad
(74) *Attorney, Agent, or Firm* — Fay Sharpe LLP

(57) ABSTRACT

A linear friction welding machine having a two-piece collet for holding a workpiece. The two-piece collet includes first and second halves that can be separated for loading the workpiece in a transverse direction, and brought together about the workpiece and locked in place to both secure the workpiece against axial movement as well as support the workpiece against transverse loads.

16 Claims, 11 Drawing Sheets

(51) Int. Cl.
  *B23K 37/04* (2006.01)
  *B23B 31/20* (2006.01)
  *B23K 20/12* (2006.01)
  *B23K 101/06* (2006.01)

(52) U.S. Cl.
  CPC .. *B23K 37/0435* (2013.01); *B23B 2231/2086* (2013.01); *B23K 2101/06* (2018.08)

(58) Field of Classification Search
  CPC .............. B23K 20/1295; B23K 20/233; B23K 2103/12; B23K 37/0426; B23K 20/00; B23K 20/128; B23K 2103/04; B23K 26/0661; B23K 28/02; B23K 37/0229; B23K 37/047; B23K 37/053; B23K 37/08; B23K 11/115; B23K 11/24; B23K 20/02; B23K 20/121; B23K 20/1215; B23K 20/22; B23K 20/2333; B23K 20/2336; B23K 2101/001; B23K 2101/06; B23K 2103/02; B23K 2103/08; B23K 2103/10; B23K 2103/14; B23K 2103/15; B23K 31/125; B23K 35/0261; B23K 35/402; B23K 37/04; B23K 37/0435; B23K 37/06
  See application file for complete search history.

(56) References Cited

U.S. PATENT DOCUMENTS

| | | | | |
|---|---|---|---|---|
| 3,512,792 | A * | 5/1970 | Nickel | A47J 31/00 279/51 |
| 3,542,383 | A * | 11/1970 | Farley | B23B 31/4033 279/2.03 |
| 3,606,968 | A * | 9/1971 | Loyd | B23K 20/12 228/2.3 |
| 3,719,983 | A * | 3/1973 | Funk et al. | B23D 79/023 228/113 |
| 4,973,823 | A | 11/1990 | Benway et al. | |
| 9,233,501 | B2 | 1/2016 | Johnson | |
| 9,333,702 | B2 | 5/2016 | Slattery | |
| 2007/0051776 | A1 | 3/2007 | Estes et al. | |
| 2013/0140348 | A1* | 6/2013 | Hunter | B23K 20/12 228/114.5 |
| 2013/0221070 | A1* | 8/2013 | Okuno | B23K 20/00 228/2.3 |

FOREIGN PATENT DOCUMENTS

| | | |
|---|---|---|
| WO | WO2013/085962 A1 | 6/2013 |
| WO | WO2017/102407 A1 | 6/2017 |

* cited by examiner

FRICTION WELDING HEAD WITH TWO-PIECE CLAMPING COLLET

CROSS REFERENCE TO RELATED PATENTS AND APPLICATIONS

This application claims priority to and the benefit of the filing date of U.S. Provisional Patent Application Ser. No. 62/571,858, filed Oct. 13, 2017, which application is hereby incorporated by reference.

BACKGROUND

The present exemplary embodiment relates to linear friction welding machines. It finds particular application in conjunction with devices for securing workpieces in a linear friction welding machine, and will be described with particular reference thereto. However, it is to be appreciated that the present exemplary embodiment is also amenable to other like applications.

Linear friction welding is a method of welding workpieces together that includes urging the workpieces toward each other while oscillating at least one of the workpieces relative to the other workpiece. Linear friction welding machines generally include holding devices for securely holding and positioning the workpieces relative to each other, and for applying a biasing force during and/or after the oscillation of at least one of the workpieces relative to the other.

Conventional linear friction welding machines typically have a first mounting fixture for holding a first workpiece that is configured to be movable along at least a first axis and a second mounting fixture for holding a second workpiece that is movable along a second axis perpendicular to the first axis. The first mounting fixture can be moved to align the first workpiece with the second workpiece. The second mounting structure can be moved to forcefully engage a weld interface of the first and second workpieces. One or both of the first and second mounting fixtures is configured to oscillate while the workpieces are forcefully engaged to thereby friction weld the workpieces together.

One of the primary challenges with linear friction welding is holding the workpieces in position in a manner that allows a large force to be applied axially (e.g., perpendicular to a weld interface) while also resisting the radial or transverse loading of the workpieces as one or more of the mounting fixtures are oscillated relative to each other. Typical mounting fixtures include a unitary, one-piece collet that is configured to axially receive a workpiece through a central aperture thereof. Such collets may include a collar or other mechanism to facilitate radial clamping of the workpiece therein.

Such collets are not ideal for certain processes, particularly because the workpiece must be loaded into the collet axially.

BRIEF DESCRIPTION

The present disclosure sets forth a linear friction welding machine having a two-piece collet for holding a workpiece. The two-piece collet includes first and second halves that can be brought together about the workpiece and locked in place to both secure the workpiece against axial movement as well as support the workpiece against transverse loading.

In accordance with one aspect, a linear friction welding machine comprises a two-piece collet assembly, wherein the two-piece collet assembly includes first and second collet halves moveable between an open configuration for loading and unloading an associated workpiece in a transverse direction and a closed configuration securing the workpiece for linear friction welding operations.

The collet halves can be supported by a welding head of the linear friction welding machine, at least one of the collet halves movable relative to the welding head. The at least one movable collet half can be supported in a sliding insert that is slideable relative to the welding head, and further can include at least one locking actuator movable between a locked position locking the slideable insert in a closed position, and an unlocked position permitting movement of the slideable insert. The welding head can be at least one of a forging head or an oscillating head.

The collet halves can be supported in a welding head and define a central aperture when in the closed configuration, the central aperture having a central axis extending therethrough, the associated workpiece being capable of being positioned between the collet halves when in the open configuration along a direction transverse to the central axis. The collet halves can be supported in respective collet insert members. The collet halves can each have a flared end accommodated in a correspondingly shaped recess of a respective collet insert member. The collet halves can be removable, whereby various size collet halves can be used to accommodate workpieces of various sizes.

In accordance with another aspect, a welding head comprises a two-piece collet assembly for securing an associated workpiece in the welding head during welding, wherein the two-piece collet assembly includes first and second collet halves moveable between an open configuration for loading and unloading the associated workpiece in a transverse direction and a closed configuration securing the associated workpiece against transverse and longitudinal movement relative to the welding head.

At least one of the collet halves can be movable relative to the welding head. The at least one movable collet half can be supported in a sliding insert that is slideable relative to the welding head, and further can include at least one locking actuator movable between a locked position locking the slideable insert in a closed position, and an unlocked position permitting movement of the slideable insert. The welding head can be at least one of a forging head or an oscillating head.

The collet halves can define a central aperture when in the closed configuration, the central aperture having a central axis extending therethrough, the associated workpiece being capable of being positioned between the collet halves when in the open configuration along a direction transverse to the central axis. The collet halves can be supported in respective collet insert members. The collet halves can each have a flared end accommodated in a correspondingly shaped recess of a respective collet insert member. The collet halves can be removable, whereby various size collet halves can be used to accommodate workpieces of various sizes.

In accordance with another aspect, a method is set forth of welding first and second workpieces together with a welding machine having at least one welding head having a two-piece collet assembly for securing one of the workpieces in the welding head during welding. The two-piece collet assembly includes first and second collet halves moveable between an open configuration for loading and unloading the associated workpiece in a transverse direction and a closed configuration securing the associated workpiece against transverse and longitudinal movement relative to the welding head. The method comprises moving the two-piece collet assembly to the open configuration by separating the first and second collet halves from each other to form a gap, moving the first work piece transversely into the gap between the first and second collet halves, and moving the two-piece collet assembly to the closed configuration by bringing the first and second collet halves together.

The method can further include moving the first workpiece longitudinally into contact with the second workpiece, and joining the first workpiece to the second workpiece using friction welding, and/or, after joining the first workpiece to the second workpiece and before removing any flash, moving the two-piece collet assembly to the open configuration by separating the first and second collet halves from each other to form a gap, and transversely removing the joined first and second workpieces from the welding machine.

DETAILED DESCRIPTION

Figure 1:
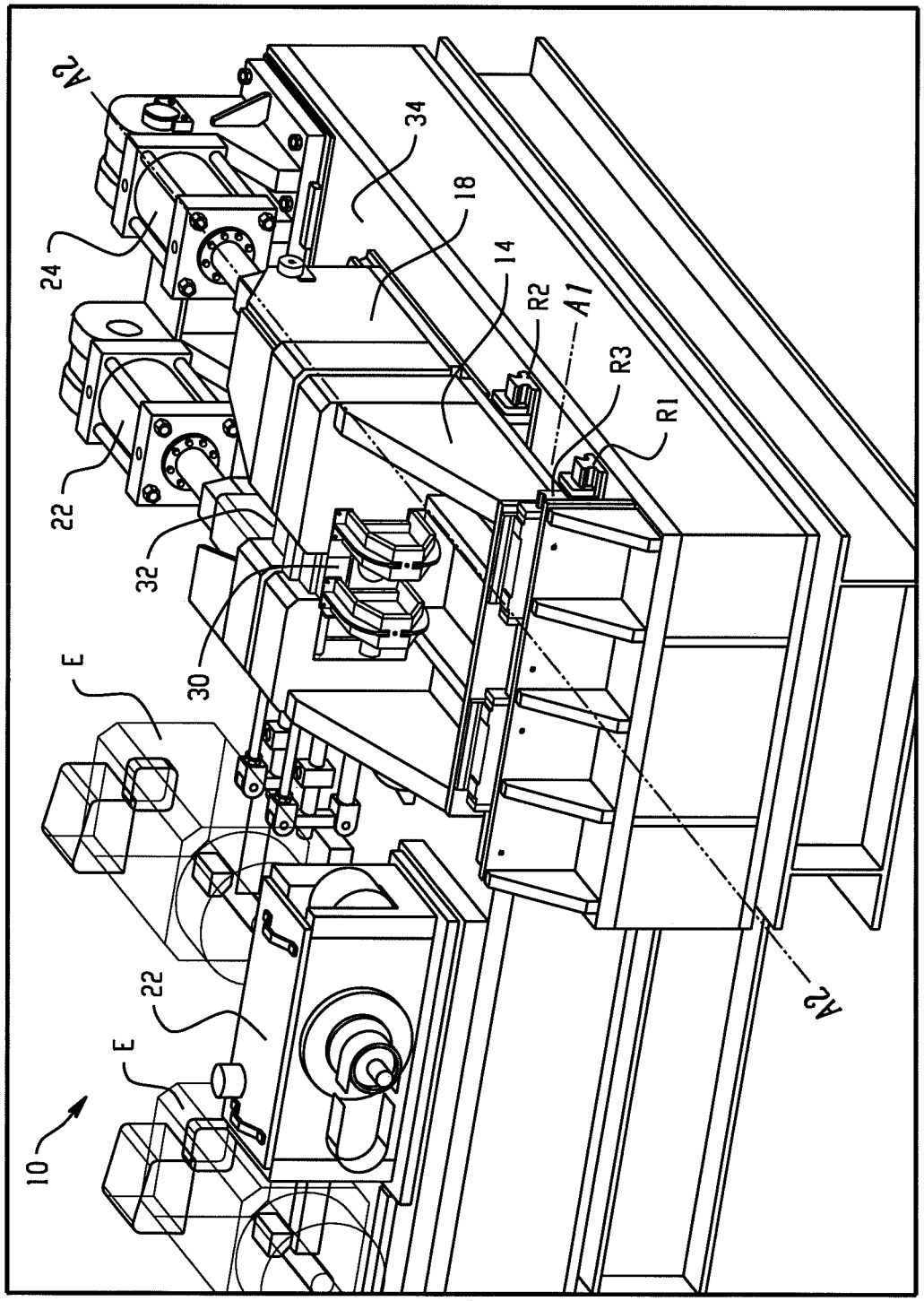
FIG. 1 is a perspective front view of an exemplary linear friction welding machine including a two-piece collet assembly in accordance with the present disclosure.
Figure 2:
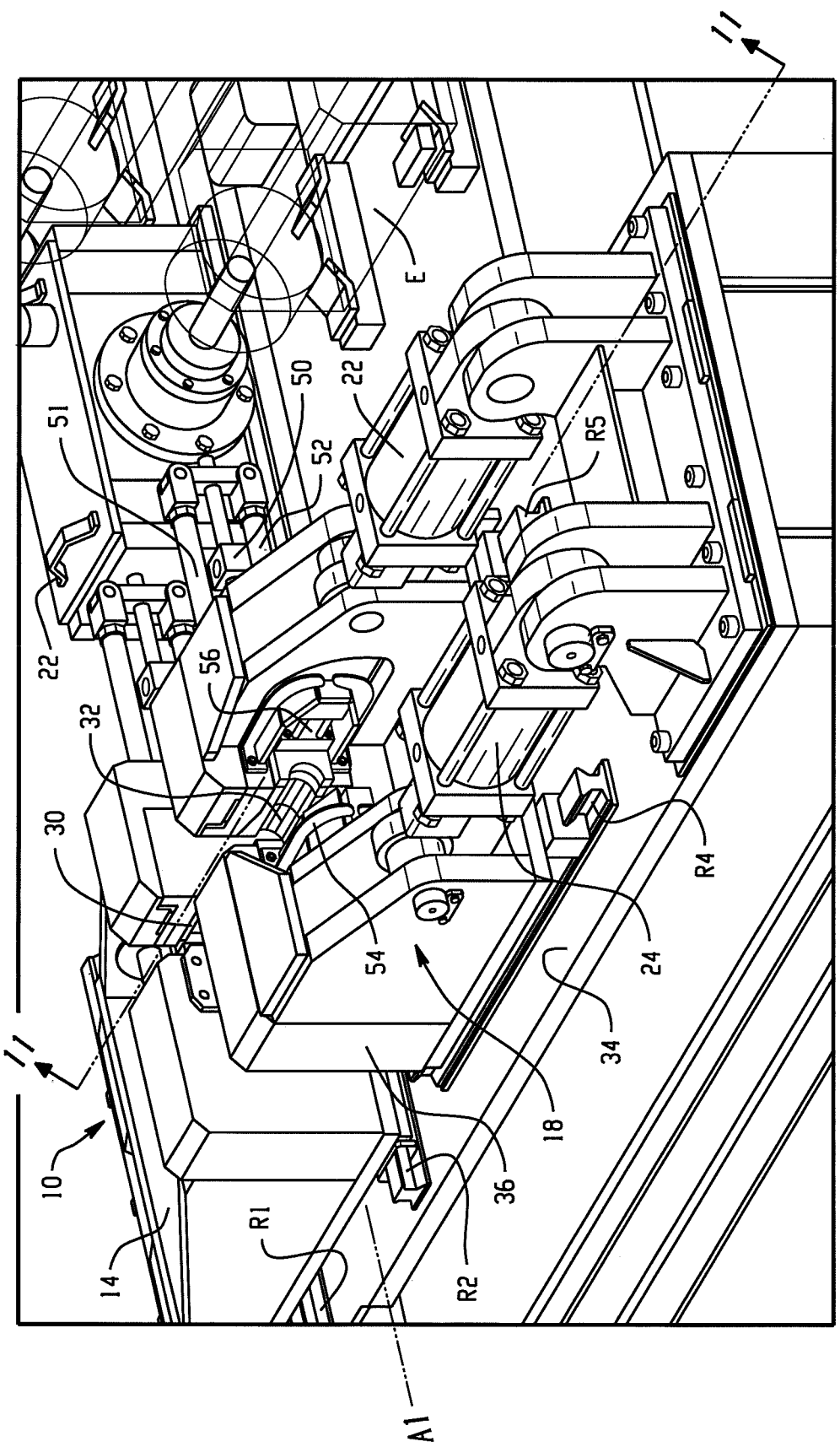
FIG. 2 is a perspective side view of the exemplary linear friction welding machine.
Figure 3:
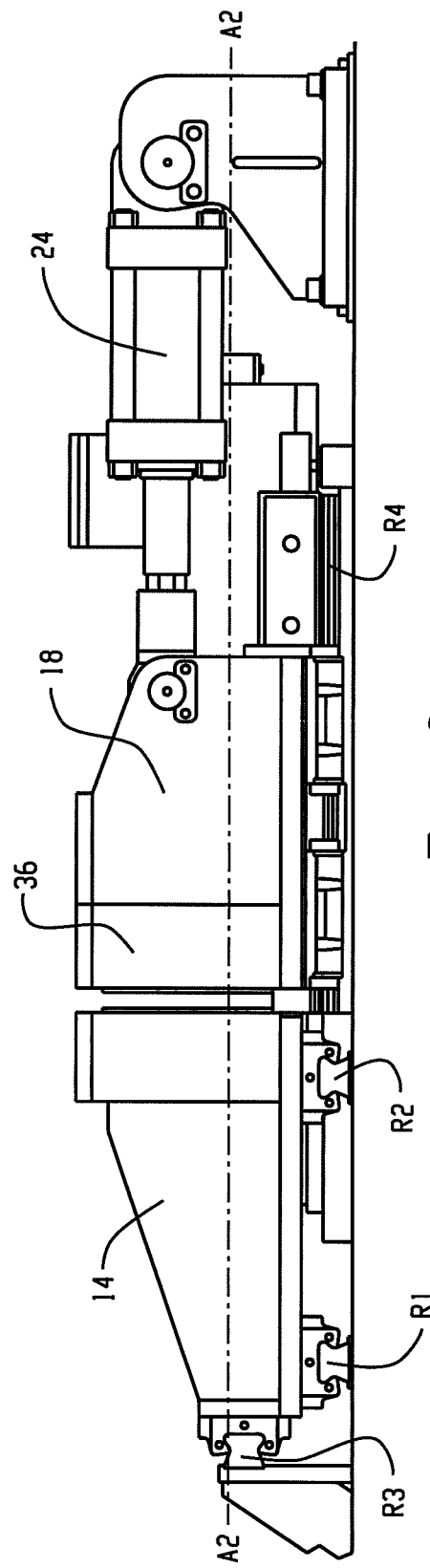
FIG. 3 is a side elevational view of the exemplary linear friction welding machine.
Figure 4:
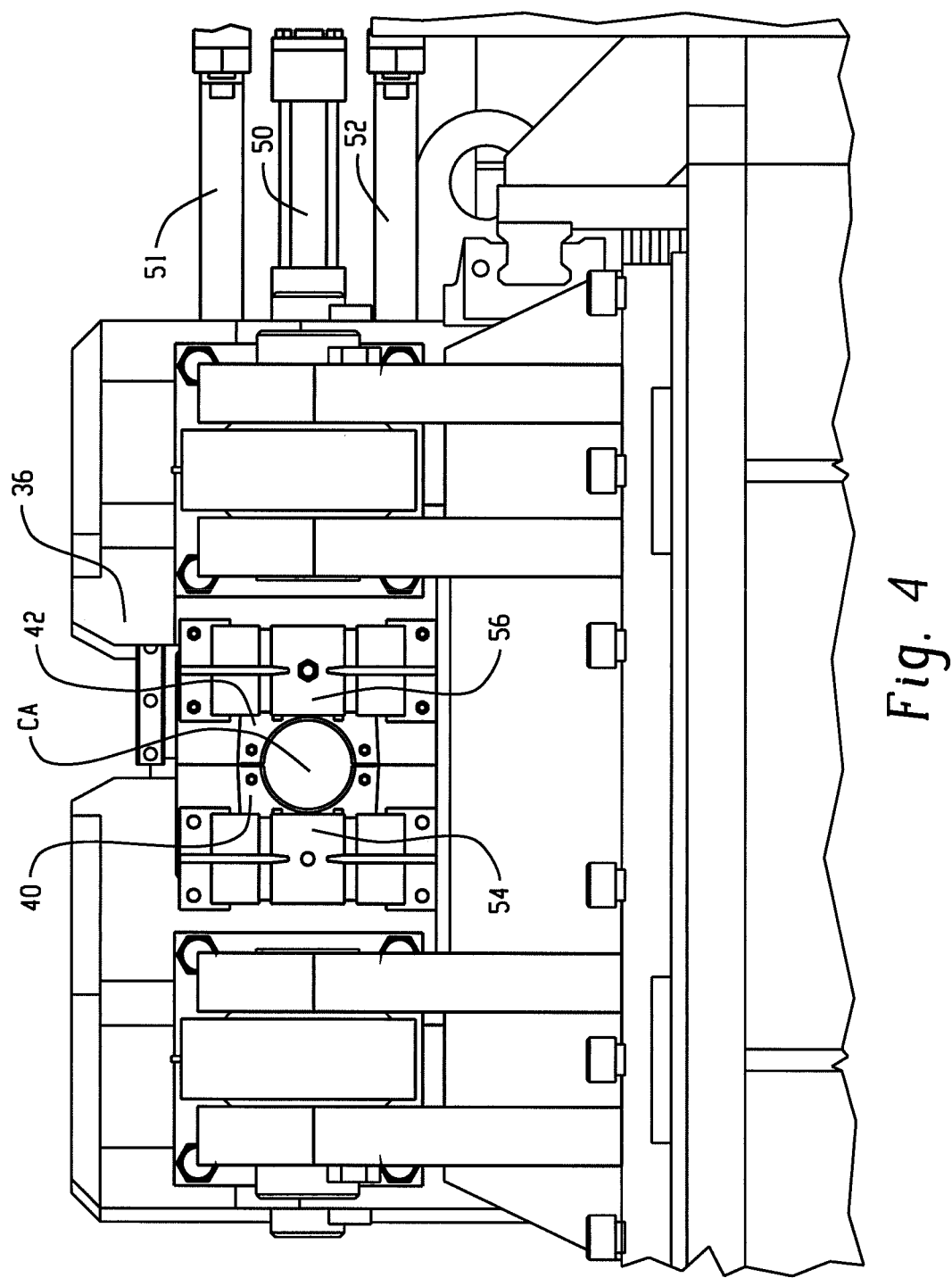
FIG. 4 is rear elevation view of the exemplary linear friction welding machine.

With reference to FIGS. 1 and 2, an exemplary linear friction welding machine (LFWM) is illustrated and identified generally by reference numeral 10. The LFWM 10 includes a two-piece collet assembly in accordance with the present disclosure, which will be described in detail below. It should be appreciated that the two-piece collet assembly of the present disclosure can be used in a wide variety of linear friction welding machines. Accordingly, the following description of the components of the exemplary LFWM 10 is general and intended to provide context for the description of the two-piece collet assembly. Certain features of the LFWM 10 are well-known in the art and, therefore, will be generally understood without specific description.

The exemplary LFWM 10 generally includes a first mounting structure 14 adapted to secure a first workpiece to be joined (not shown in the FIGS.), and a second mounting structure 18 adapted to secure a second workpiece to be joined to the first workpiece (also not shown in the FIGS.). The first mounting structure 14 (also referred to herein as an oscillating head) is supported by horizontal rails R1 and R2 for sliding movement along a first axis A1. A vertical rail R3 is also provided for vertical support. An oscillation generator 22 is operatively coupled to the oscillating head 14 for oscillating the same. The oscillation generator 22 is driven by one or more electric motors E. Typical oscillation generators employ a cam mechanism for producing an oscillating motion from a rotational input. Other types of oscillation generators can also be used in accordance with the present disclosure.

The second mounting structure 18 (referred to herein as a forge head) is supported on horizontal rails R4 and R5 for sliding movement along an axis A2 extending perpendicular to axis A1 (e.g., a press axis PA). The forge head 18 is operatively coupled to first and second rams 22 and 24 configured to force the forge head 18 towards the oscillating head 14. The first and second rams 22 and 24 can be of any suitable construction and can be powered by hydraulics, pneumatics, or electricity (e.g., an electromechanical hydraulic actuator), for example. As will be described in detail below, each of the oscillating head and the forge head 14 and 18 further include a two-piece collet assembly 30 and 32 for securing respective first and second workpieces during welding. All of the components of the LFWM 10 are mounted to a suitable support surface 34.

In operation, the oscillating head and the forge head 14 and 18 of the LFWM 10 are loaded with the first and second workpieces, respectively. The oscillating head 14 is then aligned along axis A1 such that the first workpiece is aligned with the second workpiece. The forge head 18 is then moved along axis A2 to engage respective surfaces of the first and second workpieces at a weld interface.

Once the workpieces are aligned and engaged, a linear friction welding routine is employed to join the workpieces. Such routine can typically involve forcing the workpieces together, and oscillating the first workpiece relative to the second workpiece while maintaining the workpieces under compressive engagement. Once the weld interface of the work pieces has reached a sufficient temperature, oscillation is stopped, and the forge head 18 is used to force the second workpiece further against the first workpiece to upset the weld interface. Once cooled, the first and second workpieces are joined together to form a solid state bond.

As with the LFWM 10 itself, aspects of the present disclosure can be used with a wide variety of linear friction welding methods. Accordingly, the method outlined above is merely exemplary, and it should be appreciated that other methods can be used without departing from the scope of the present disclosure.

Turning now to FIGS. 5-11, and in accordance with the present disclosure, the details of the two-piece collet assemblies 30 and 32 will be described. It should be understood that the following discussion is primarily directed to the two-piece collet assembly 32 of the forge head 18, but is equally applicable to the two-piece collet assembly 30 of the oscillating head 14.

In the illustrated exemplary embodiment, the forge head 18 generally includes a forge head body 36 which is mounted on rails R3 and R4 for movement as previously described. The forge head body 36 has a general c-shape in cross-section. First and second collet halves 40 and 42 are supported by the forge head body 36. The first collet half 40 is fixed to the forge head body 36 via an insert member 44 which is bolted to the forge head body 36. The second collet half 42 is supported for sliding movement towards and away from the first collet half 40 by a sliding insert member 46, which itself is slideably mounted to the forge head body 36. A collet ram 50 is configured to move the sliding insert member 46 and second collet half 42 towards and away from the first collet half 40 (e.g., between an open position for loading/unloading a workpiece and a closed position clamping the workpiece between the first and second collet halves 40 and 42). Upper and lower guide rods 51 and 52 help stabilize the sliding insert member 46 during movement.

Figure 9:
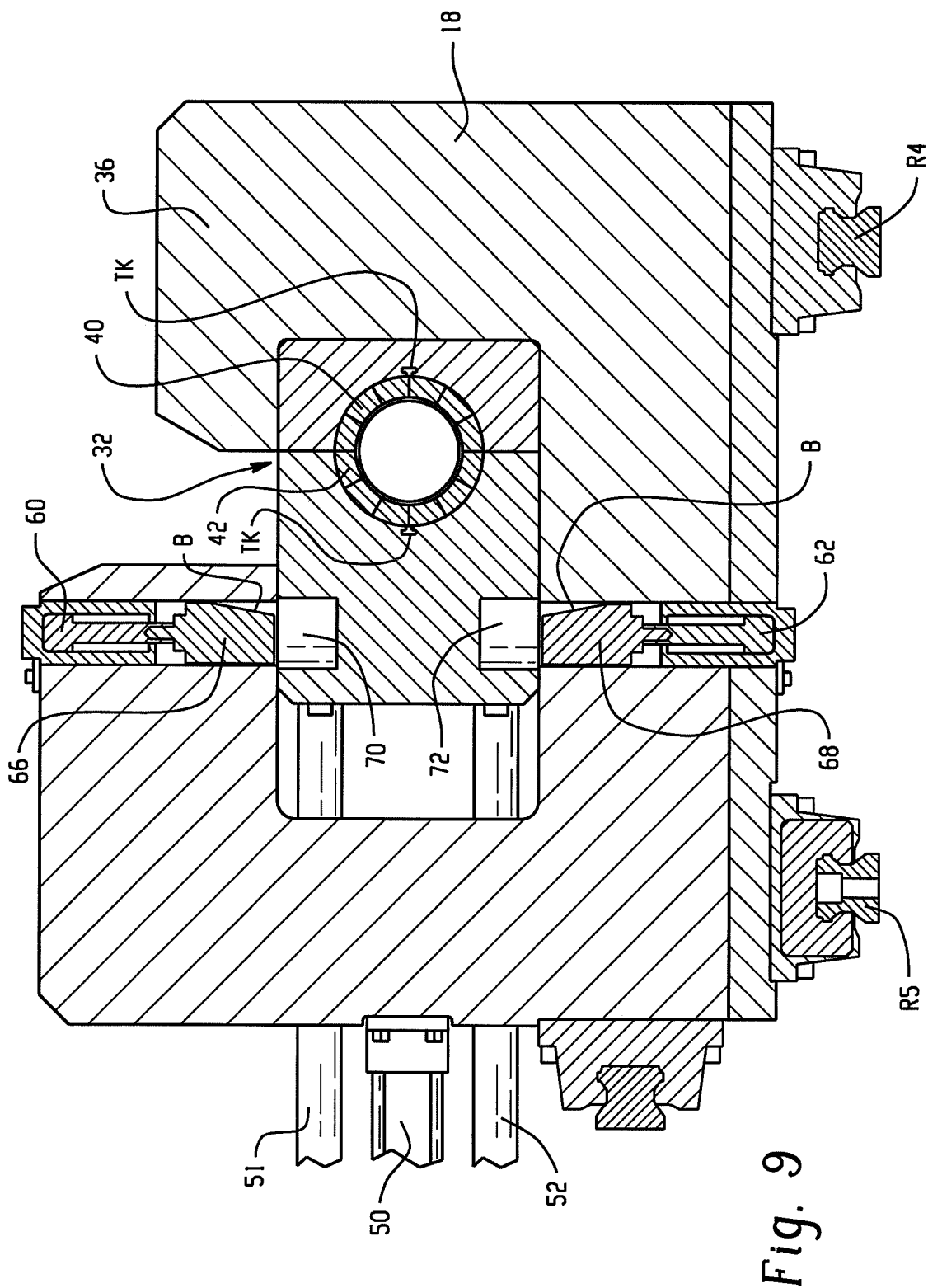
FIG. 9 is a cross-sectional view taken through the exemplary two-piece collet assembly in a closed configuration with the upper and lower locking actuators in an unlocked position.
Figure 10:
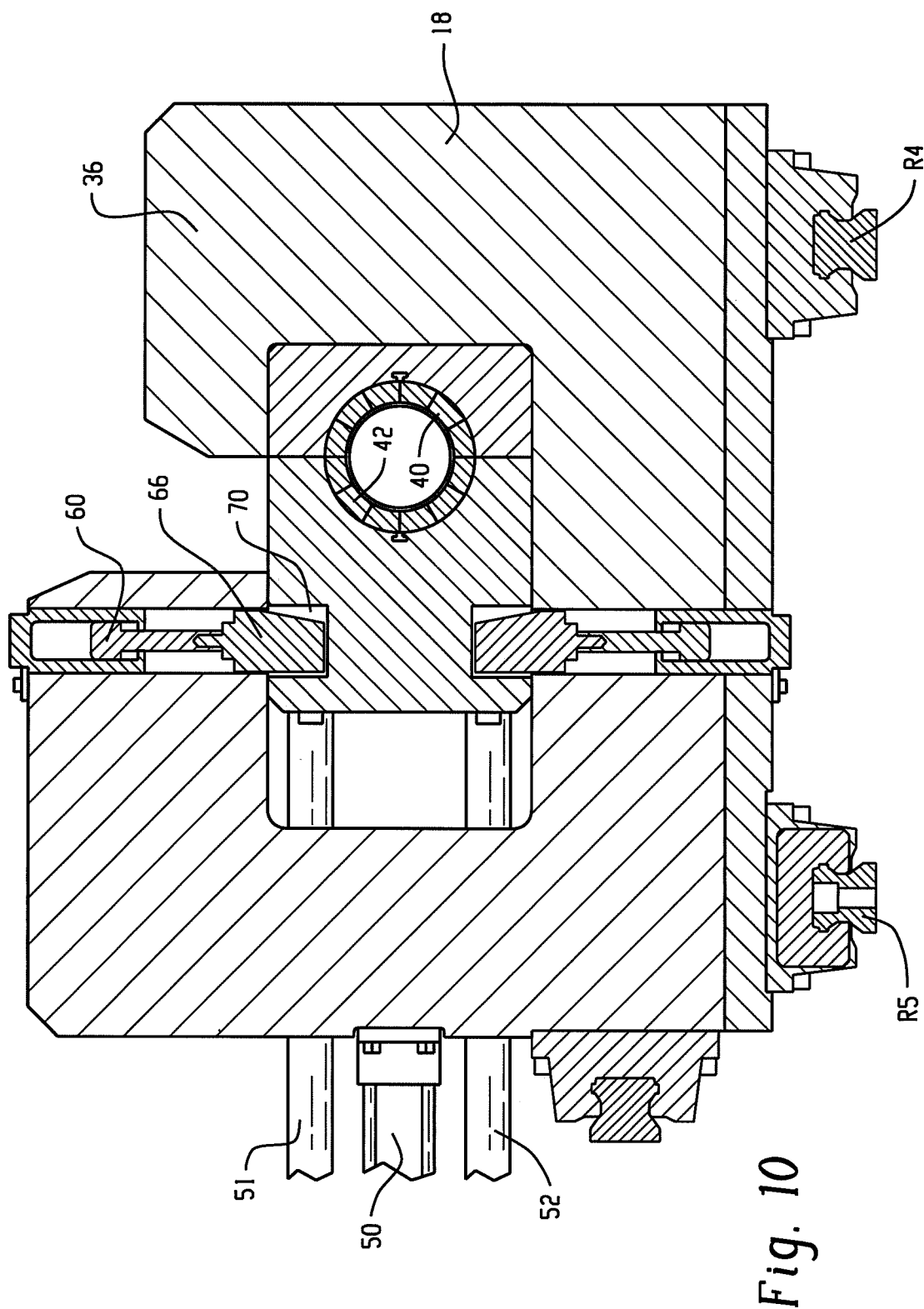
FIG. 10 is a cross-sectional view taken through the exemplary two-piece collet assembly in a closed configuration with the upper and lower locking actuators in a locked position.
Figure 11:
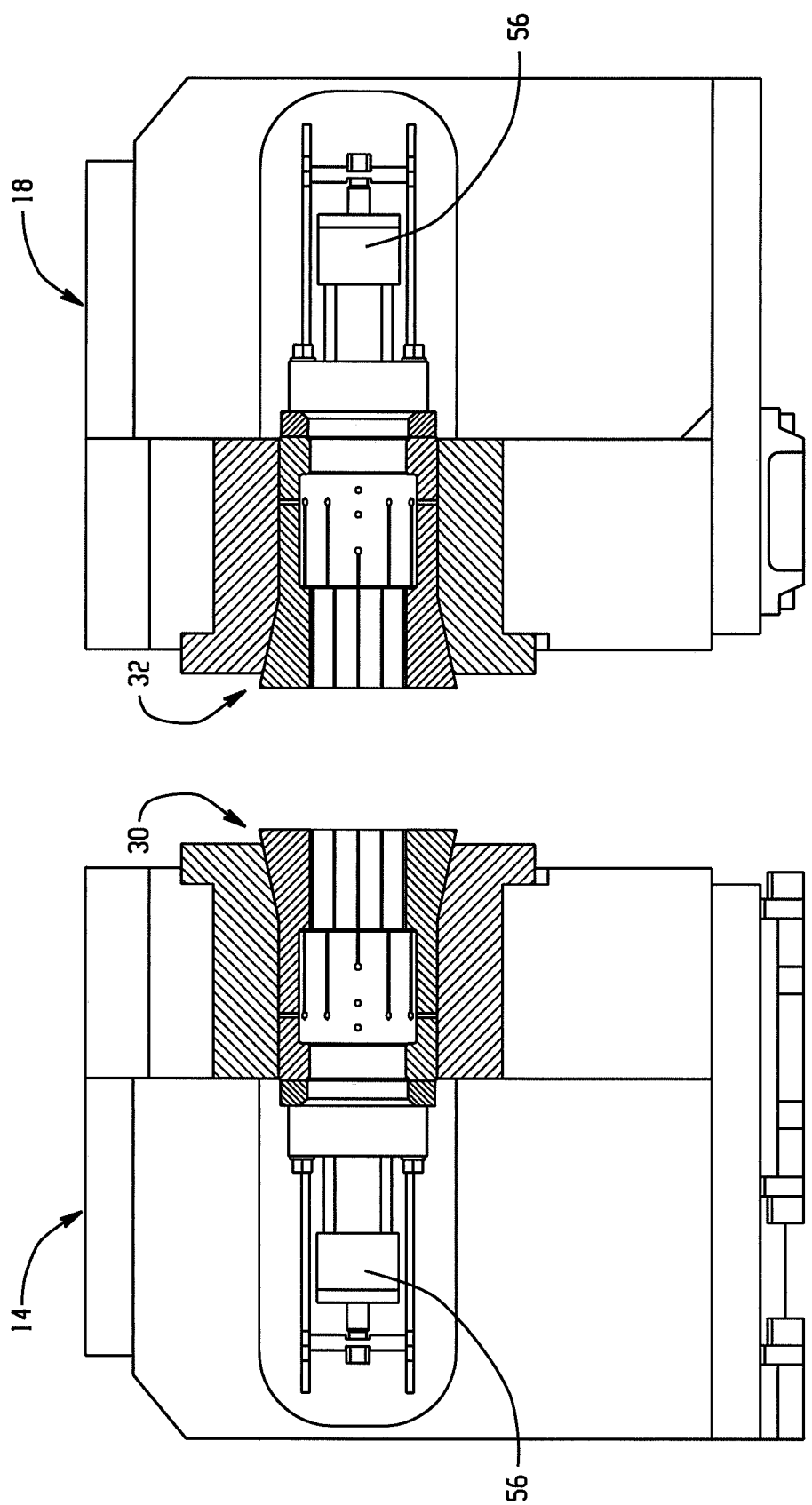
FIG. 11 is a cross-sectional view taken through the exemplary linear friction welding machine along the line 11-11 in FIG. 2.

Both of the collet halves 40 and 42 are keyed to their respective insert members 44 and 46 (e.g., with a T-key TK as shown in FIG. 9). As such, the collet halves 40 and 42 can be replaced with collet halves of a different size and/or shape to accommodate a wide variety of workpieces shapes and sizes.

The collet halves 40 and 42, when joined together define a central aperture CA through which a workpiece is configured to extend. A plurality of slits S in the collet halves 40 and 42 are configured to allow the collet halves 40 and 42 to constrict the central aperture CA to tightly surround the workpiece. The first and second collet halves 40 and 42 have alignment features (e.g., dowels D in one half, corresponding recesses for receiving dowels in the other half) to ensure proper alignment when the collet halves 40 and 42 are brought together.

The collet halves 40 and 42 in the illustrated embodiment include a flared end that is accommodated in a correspondingly shaped recess of each insert member 44 and 46. Due to the keyed connection of the collet halves 40 and 42 to their respective fixed and movable insert members 44 and 46, the collet halves 40 and 42 are slideable in an axial direction (e.g., an axis parallel to axis A2). Each collet half 40 and 42 is coupled to a respective collet hydraulic actuator 54 and 56 configured to pull back on each collet half 40 and 42 such that the flared end of the collet halves 40 and 42 is forced axially inwardly thereby clamping a workpiece therebetween. Clamping force can be controlled, at least in part, by controlling the amount of force applied to each of the collet halves 40 and 42 by the hydraulic actuators 54 and 56.

It should be appreciated that as an axial load is applied to a workpiece secured between the collet halves 40 and 42, the flared end of each collet half 40 and 42 is urged deeper into the recess of each insert member 44 and 46 thereby maintaining or increasing a radial clamping force of the collet halves 40 and 42 on the workpiece.

During welding operations significant lateral forces are developed, particularly when the workpieces are oscillated relative to each other. These lateral forces tend to urge the first and second collet halves 40 and 42 apart. In order to resist these forces, and to maintain the collet halves 40 and 42 tightly engaged with a workpiece for the purpose of applying axial pressure, upper and lower actuators 60 and 62 are configured to drive upper and lower pins 66 and 68 into corresponding upper and lower receptacles 70 and 72 in the sliding insert member 46, when the sliding insert member 46 is in the closed position (e.g., collet halves 40 and 42 engaged).

Figure 5:
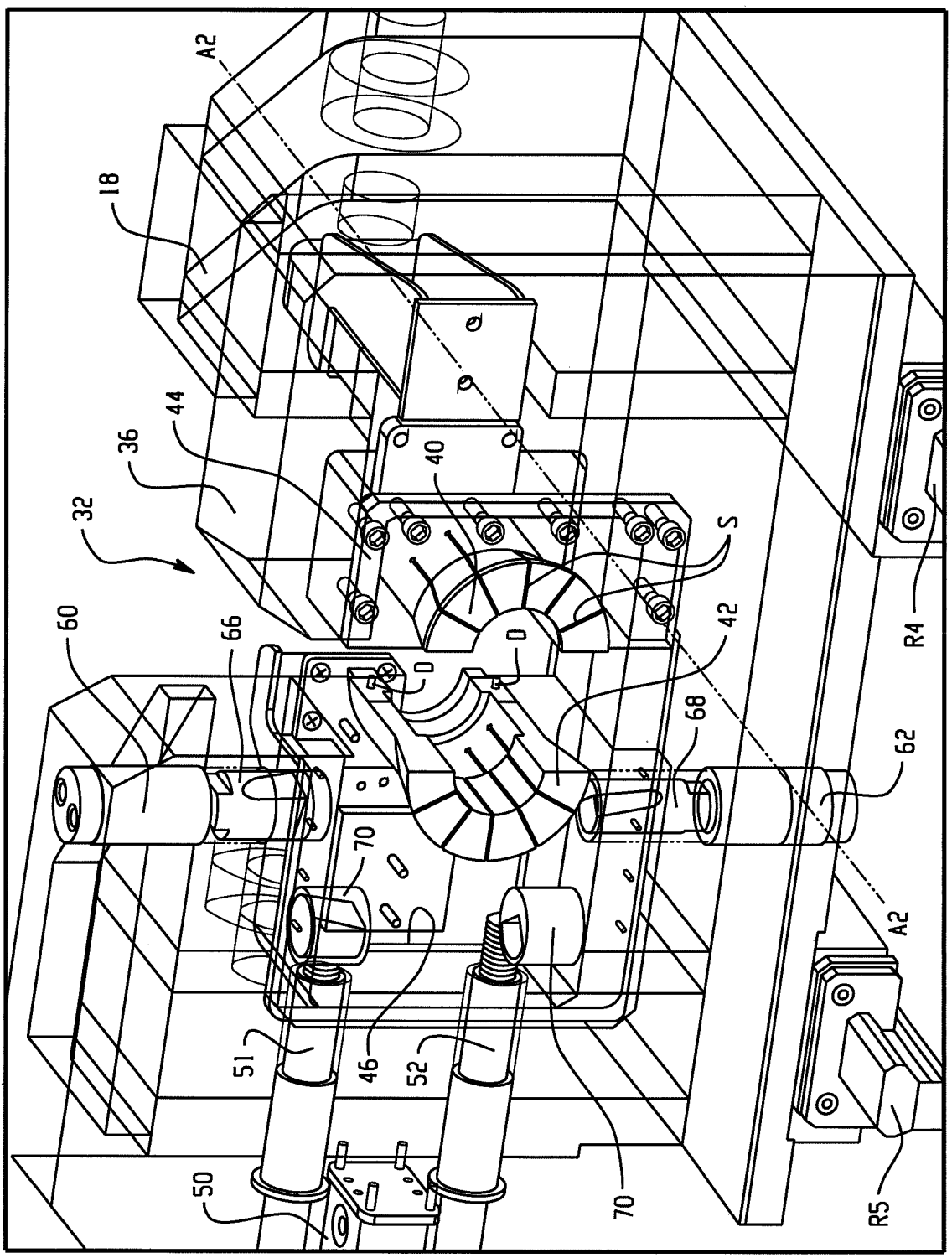
FIG. 5 is an enlarged perspective view of the exemplary two-piece collet assembly in an open configuration.
Figure 6:
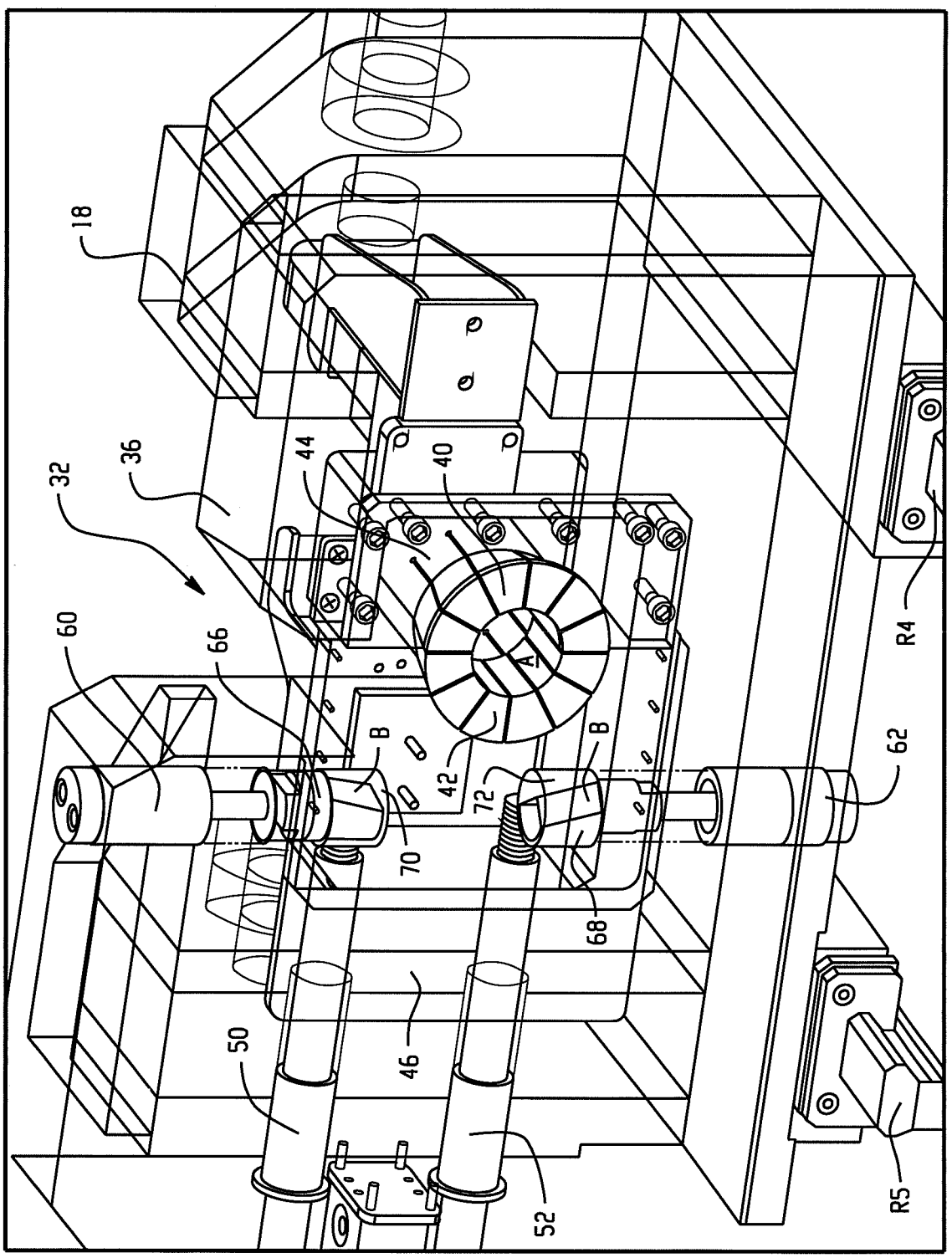
FIG. 6 is an enlarged perspective view of the exemplary two-piece collet assembly in a closed configuration.
Figure 7:
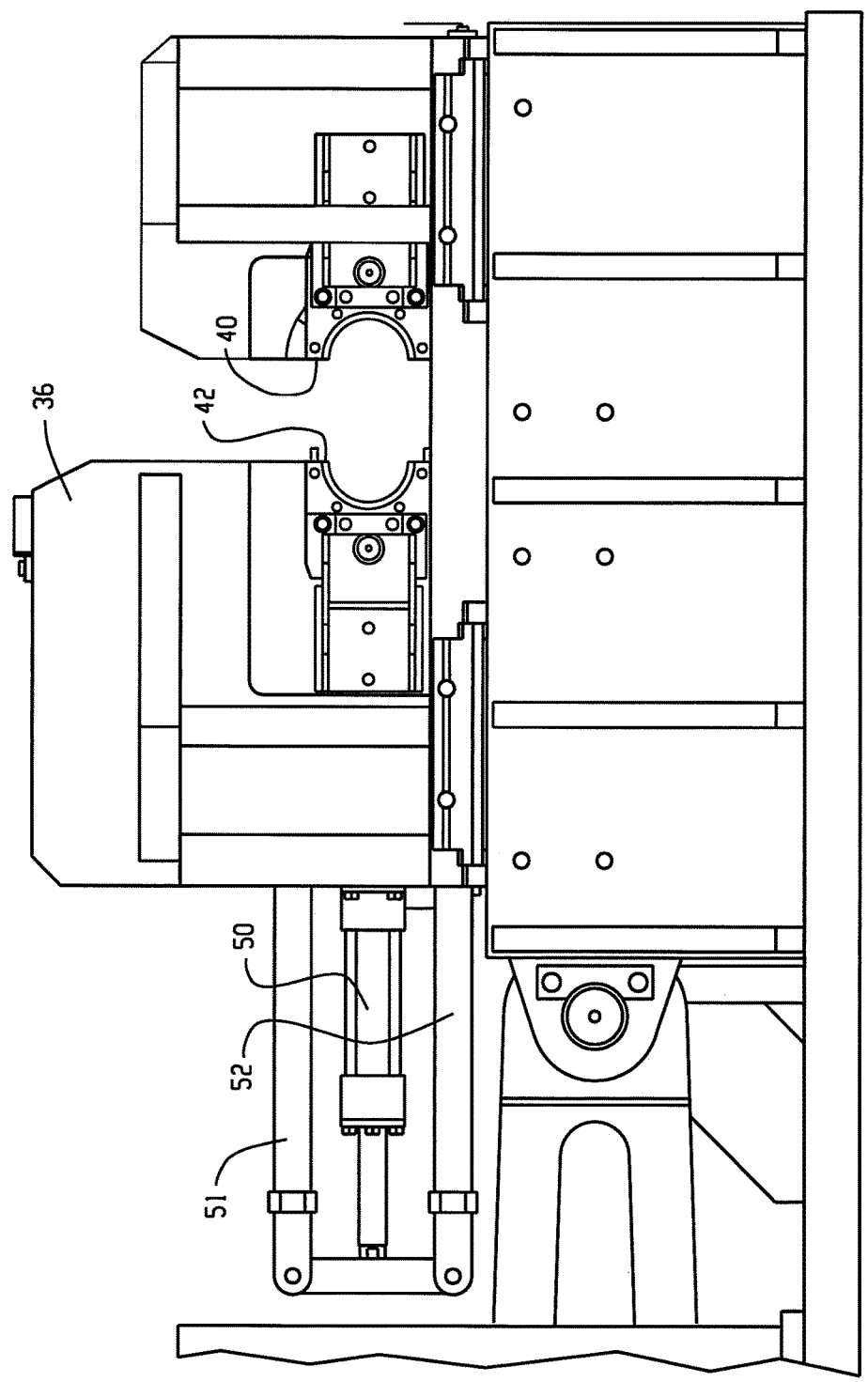
FIG. 7 is an end view of the exemplary two-piece collet assembly in an open configuration.
Figure 8:
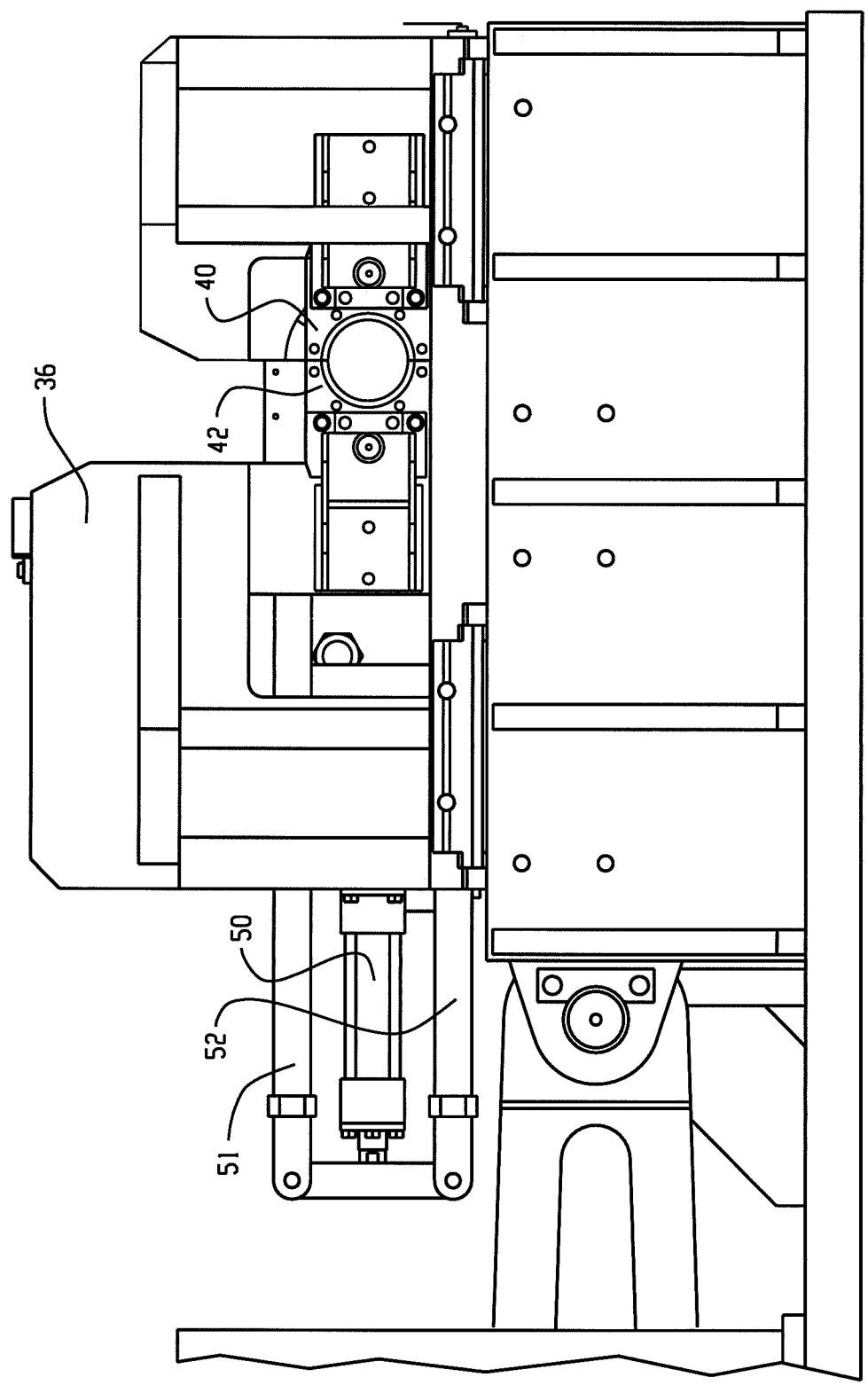
FIG. 8 is an end view of the exemplary two-piece collet assembly in an closed configuration.

For example, as shown in FIG. 5, the sliding insert member 46 is in the open position with the collet ram 50. In this position, the upper and lower receptacles 70 and 72 are not aligned with the upper and lower pins 66 and 68. In FIG. 6, the collet ram 50 is extended thereby forcing the sliding insert member 46 to the right to a position at which the upper and lower receptacles 70 and 72 are at least partially aligned with the upper and lower pins 66 and 68, and the collet halves 40 and 42 are engaged with each other. Once at least partially aligned, the upper and lower actuators 60 and 62 drive upper and lower pins 66 and 68 into the upper and lower receptacles 70 and 72, respectively.

Each of the upper and lower pins 66 and 68 have a chamfered or beveled surface B (e.g., a flat surface extending at an angle to the central axis of the pin from an axial end face of the pin to an outer circumference of the pin). It should be appreciated that each of the upper and lower receptacles 70 and 72 have a corresponding shape such that the pins 66 and 68 are closely received therein. The beveled surfaces B and correspondingly shaped receptacles allow the pins 66 and 68 to be advanced into the receptacles 70 and 72 a variable amount to accommodate wear of the components during usage. That is, when certain components wear, the pins 66 and 68 can be advanced deeper into the receptacles 70 and 72 to take up any excess tolerance that develops.

As best seen with reference back to FIG. 2, first and second workpieces can be loaded into the linear friction welding machine 10 from above. From a manufacturing standpoint, such load direction is more amenable to higher production units than axial load machines with solid collets. For example, in one configuration, the first and second workpieces can be loaded into the linear friction welding machine 10 from above, joined together, and ejected rearwardly or vertically from the linear friction welding machine 10. Accordingly, loading and unloading of the linear friction welding machine can be automated. Cycle times for a LFWM in accordance with the present disclosure can be 10 seconds or less.

In addition, the present disclosure facilitates the use of overhead cranes to be used for loading and/or unloading the workpieces. This allows for heavier workpieces to be welded while utilizing existing crane assemblies within a factory, for example. It should also be understood that the split collet assembly of the present disclosure facilitates more compact installations of the LFWM 10, and that flash removal can be performed after the combined workpiece is removed from the LFWM 10.

By way of example, consider a prior art welding machine with solid collets that must be loaded and unloaded axially. Workpieces can be loaded into respective mounting structures from opposite sides but, once joined together, the combined workpieces need to be translated in one direction axially through both solid collets to be unloaded. Accordingly, such welding machines require clearance adjacent thereto up to at least a maximum combined workpiece dimension. Thus, if two five foot long workpieces are welded together, at least ten feet of clearance is required on one side of the machine for removing the finished product. Depending on the particular application, the LFWM 10 of the present disclosure may only need five feet of clearance to join two five foot long workpieces, since the combined workpiece can be unloaded vertically from the LFWM 10.

A further advantage the LFWM 10 has over welding machines employing solid collets is that the workpiece can be removed prior to removing any flash at the weld interface. In prior art welding machines, in order to translate the workpiece axially through the solid collets, any flash must typically be removed from the weld joint. This is typically done by a process that produces metal debris that can cause accelerated wear and/or interfere with long term performance of the prior art machines with solid collets. The LFWM 10 of the present disclosure need not suffer any ill effects from contamination from flash removal debris.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A linear friction welding machine comprising a two-piece collet assembly, wherein the two-piece collet assembly includes first and second collet halves moveable between an open configuration for loading and unloading an associated workpiece in a transverse direction and a closed configuration securing the workpiece for linear friction welding operations, and wherein the collet halves are supported by a body of a welding head of the linear friction welding machine, each of the collet halves slideable relative to the body in a direction perpendicular to the transverse direction.

2. The linear friction welding machine of claim 1, wherein the first collet half is supported in a sliding insert that is slideable relative to the body of the welding head, and further comprising at least one locking actuator movable between a locked position locking the slideable insert in a closed position, and an unlocked position permitting movement of the slideable insert.

3. The linear friction welding machine of claim 2, wherein the welding head is at least one of a forging head or an oscillating head.

4. The linear friction welding machine of claim 1, wherein the collet halves are supported in a body of a welding head and define a central aperture when in the closed configuration, the central aperture having a central axis extending therethrough, the associated workpiece capable of being positioned between the collet halves when in the open configuration along a direction transverse to the central axis, and wherein the body is mounted on first and second rails.

5. The linear friction welding machine of claim 4, wherein the collet halves are supported in respective collet insert members.

6. The linear friction welding machine of claim 5, wherein the collet halves each have a flared end accommodated in a correspondingly shaped recess of a respective collet insert member.

7. The linear friction welding machine of claim 1, wherein the collet halves are removable, whereby various size collet halves can be used to accommodate workpieces of various sizes.

8. A welding head comprising a two-piece collet assembly for securing an associated workpiece in the head during welding, wherein the two-piece collet assembly includes first and second collet halves moveable between an open configuration for loading and unloading the associated workpiece in a transverse direction and a closed configuration securing the associated workpiece against transverse and longitudinal movement relative to the welding head, and wherein the collet halves are supported by a body of the welding head, each of the collet halves slideable relative to the body in a direction perpendicular to the transverse direction.

9. The welding head of claim 8, wherein the first collet half is supported in a sliding insert that is slideable relative to the body of the welding head, and further comprising at least one locking actuator movable between a locked position locking the slideable insert in a closed position, and an unlocked position permitting movement of the slideable insert.

10. The welding head of claim 8, wherein the welding head is at least one of a forging head or an oscillating head.

11. The welding head of claim 8, wherein the collet halves are supported in respective collet insert members.

12. The welding head of claim 8, wherein the collet halves each have a flared end accommodated in a correspondingly shaped recess of a respective collet insert member.

13. The welding head of claim 8, wherein the collet halves are removable, whereby various size collet halves can be used to accommodate workpieces of various sizes.

14. The welding head of claim 8, wherein the collet halves define a central aperture when in the closed configuration, the central aperture having a central axis extending therethrough, the associated workpiece capable of being positioned between the collet halves when in the open configuration along a direction transverse to the central axis.

15. The linear friction welding machine of claim 1, wherein the first collet half is movable relative to the body and the second collet half fixed relative to the body.

16. The welding head of claim 8, wherein the first collet half is movable relative to the body and the second collet half fixed relative to the body.

* * * * *